Aug. 19, 1924.

F. S. HERBERT ET AL 1,505,144

LIFT FOR TWO WHEELED TRAILER VEHICLES

Filed April 5, 1920  2 Sheets-Sheet 2

WITNESSES:
Frank D. Warren
C. H. Quincey

INVENTORS:
Fred S. Herbert
Herman J. Mooney
by John F. Mullaney
ATTORNEY.

Patented Aug. 19, 1924.

1,505,144

UNITED STATES PATENT OFFICE.

FRED S. HERBERT AND HERMAN J. MOONEY, OF COLORADO SPRINGS, COLORADO.

LIFT FOR TWO-WHEELED TRAILER VEHICLES.

Application filed April 5, 1920. Serial No. 371,513.

*To all whom it may concern:*

Be it known that we, FRED S. HERBERT and HERMAN J. MOONEY, both citizens of the United States, residing in Colorado Springs, in the county of El Paso and State of Colorado, have invented a new and useful Lift for Two-Wheeled Trailer Vehicles, of which the following is a specification.

Our invention relates to automobile trucks and trailers, the object being to provide means for utilizing the power of the automobile truck to raise and release the trailer from the said truck, and to support said trailer when released. It is customary to uncouple trailers and leave them to be loaded or unloaded, so that the truck may in the meantime be utilized. The method now used to raise the forward end of a trailer is by means of jack screws and this operation requires the combined efforts of several men, while with the aid of this invention the work may be done more easily and expeditiously by one man.

Figure 1:
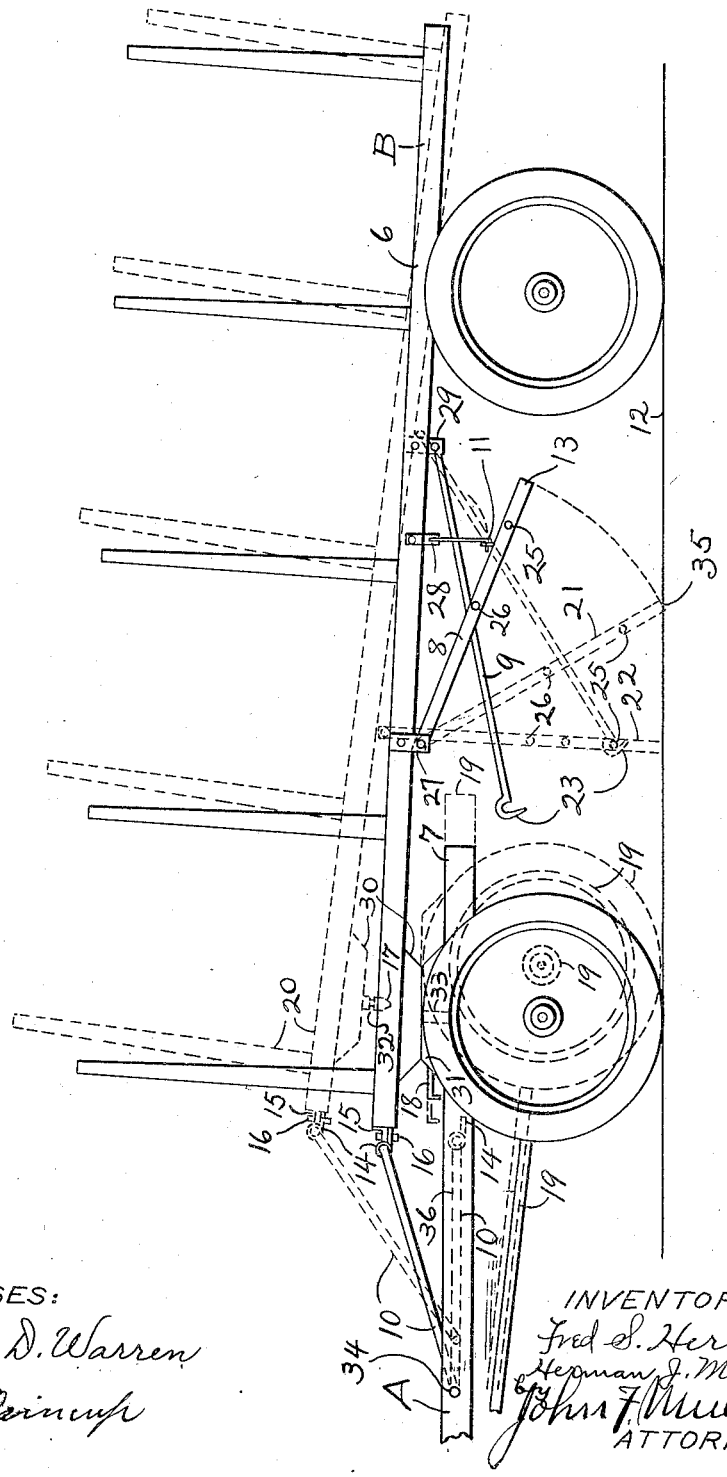
Figure 2:
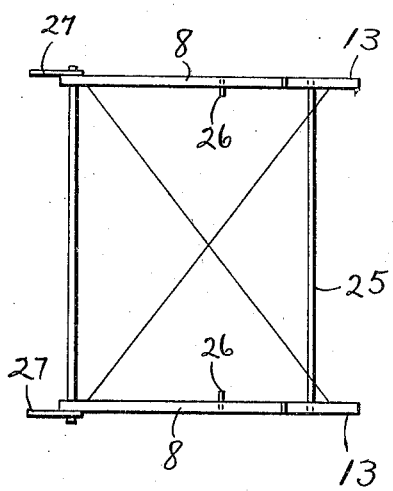
Figure 3:
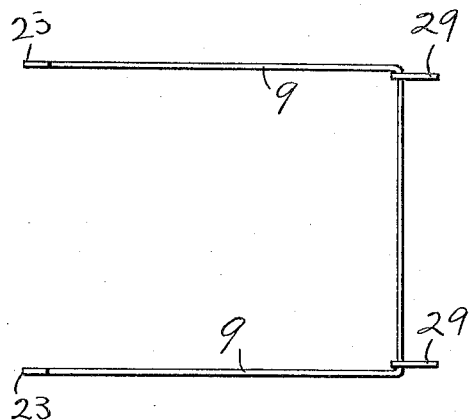
Figure 4:
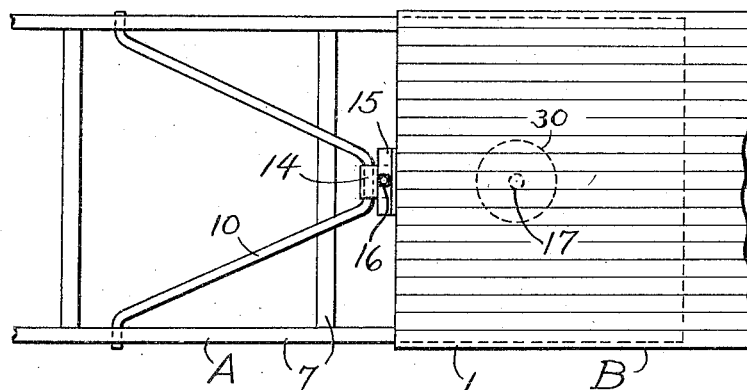
Figure 5:
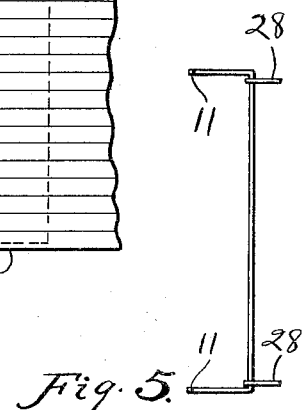

Referring to the drawings, Fig. 1 is a diagrammatic elevation of a trailer B and the rear portion of a truck A. Fig. 2 is a detailed view of the legs 8 used to support the forward end of the trailer when the truck is released. Fig. 3 is a detailed view of the braces 9. Fig. 4 is a plan view of the rear end of the said truck and the forward end of the said trailer, showing them connected by the toggle yoke member 10. Fig. 5 is a detailed view of the hook member 11.

In the drawings like numerals refer to like parts thruout the several views.

In operation the hooks 11 are disengaged from the legs 8 which permits their lower ends 13 to fall to the ground 12, as indicated by the dotted lines 21. The yoke member 10 is secured to the forward end of the trailer by clamping the hinge member 14, pivotally secured to the said yoke, to the bracket 15 on the forward end of the trailer by means of a bolt 16. The king-bolt 17 is released from the lower member of the fifth wheel by drawing the key 18 from engagement with the annular recess 32 in the said kingbolt. A backward movement of the truck, indicated by the dotted outlines 19, results in the forward end of the trailer being raised, as indicated by the dotted outline 20, by means of the yoke member or guiding brace 10. The said legs are then swung forward into position as indicated by the dotted outline 22, and in this position form supports for the trailer. The braces 9 are shown in Fig. 1, resting upon the supporting pins 26 and by the lowering of the legs 8 the braces 9 are automatically lowered and the hooks 23 are secured to the crossbar 25 of the said legs 8 by the hooks 23 engaging the supporting pins 26. The said braces prevent forward or backward movement of the trailer. The effect of backing the said truck may result in backing the trailer also and in that event the said legs will engage the ground and offer resistance to the backward movement of the trailer and co-operate with the toggle yoke or guiding brace 10 in lifting the forward end of the trailer. The said legs 8, hooks 11 and braces 9 are pivotally secured to the bed 6 of the said trailer by means of brackets 27, 28 and 29 respectively. The yoke 10 which acts as a guiding brace for element 17 is pivoted to the bed 7 of the said truck forming a pivot 34, and the legs 8 in contact with the ground form a pivot 35, and the said pivot 34 must approach the other pivot 35 in the process of lifting the forward end of the said trailer. When the yoke 10 is not in use it is laid down on the bed 7 of the said truck, as indicated by the dotted lines 36. The truck may be reengaged to the trailer by reversing the foregoing process. The truck is backed into position beneath the front end of the trailer, the yoke 10 is secured to the said trailer as before, the hooks 23 are disengaged from the cross-bar 25 and the braces 9 are placed upon the supporting pins 26 projecting from the inner side of the legs 8, and a forward movement of the truck draws the trailer forward and the king-bolt 17 secured to the upper member 30 of the fifth wheel, drops into its socket 33 in the lower member 31 of the fifth wheel of the said truck. The said key 18 is provided to lock the said king-bolt in position, and the legs, now in the position shown by dotted lines 21, are raised and secured in position by means of the hooks 11.

Having thus described our invention, we claim—

1. In the combination of an automotive tractor and a two-wheeled trailer detachably secured to said tractor, and having upright and pivoted leg supports to sustain the front end of said trailer when the tractor is removed therefrom, and having means on the underside near the front end of the frame of the trailer for pivotally connecting it with the top of the rear part of the frame of said tractor, which means comprises a downwardly extending king-pin secured rigidly to the under side of the frame of said trailer and a socket hole in a metal plate on the top of the frame of said tractor provided to receive said king-pin and a locking element 18 slidably mounted in said plate and provided to lock said king-bolt therein; the combination of the supplemental guide brace 10, comprising a yoke-shaped brace pivotally secured at its spread front lower ends to the side frames of said tractor and pivotally and detachably secured at its upper rear end to the front end of the trailer frame, and provided to guide said king-pin into said socket hole and to sustain part of the strain that would otherwise come on said king-pin in operating said trailer.

2. The combination with the mechanism of a two-wheeled trailer vehicle of the class described operated by an automotive tractor member and said trailer having two supporting legs pivotally secured to the under part of the front end of it and provided to fold backwardly under said trailer and be detachably secured to its frame, and the front end of said trailer being provided with means for securing it pivotally to the top rear portion of said tractor, and said means consisting in part of a downwardly extending king-pin secured rigidly to the under side of the front end of said trailer and a registering plate secured to the top of the rear end of said tractor and provided with a hole near its longitudinal centre adapted to receive said king-pin, locking means for securing said king-pin within said hole, and toggle means for raising the front end of said trailer so that said king-pin will rise out of said hole by backing said tractor after releasing said securing means from the king-pin; of a supplemental guide brace member 10, consisting of a V-shaped metal bar with its apex detachably secured pivotally to the central part of the front end of the frame of said trailer and its free ends extending downwardly and forward and pivotally secured to the opposite sides of the frame of said tractor and provided to sustain part of the pulling and pushing strain that would otherwise be exerted entirely on said king-pin and to guide said king-pin in registering with said hole and to assist in acting as a toggle in raising said trailer from said tractor substantially as set forth.

FRED S. HERBERT.
HERMAN J. MOONEY.

Witnesses:
D. M. HERBERT,
W. F. MARKER.